(12) United States Patent
Lee et al.

(10) Patent No.: US 11,164,000 B2
(45) Date of Patent: Nov. 2, 2021

(54) METHOD AND MOBILE TERMINAL FOR PROVIDING INFORMATION BASED ON IMAGE

(71) Applicant: LG ELECTRONICS INC., Seoul (KR)

(72) Inventors: Eun Sang Lee, Bucheon-si (KR); Hye Young Koo, Seoul (KR); In Suk Kim, Bucheon-si (KR); Jin Seong Lee, Gwangmyeong-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/600,125

(22) Filed: Oct. 11, 2019

(65) Prior Publication Data
US 2020/0042795 A1  Feb. 6, 2020

(30) Foreign Application Priority Data
Aug. 20, 2019  (KR) .......................... 10-2019-0101932

(51) Int. Cl.
| | | |
|---|---|---|
| *G06K 9/00* | (2006.01) | |
| *G06F 9/451* | (2018.01) | |
| *G06F 3/01* | (2006.01) | |
| *G06F 3/0346* | (2013.01) | |

(52) U.S. Cl.
CPC ......... *G06K 9/00671* (2013.01); *G06F 9/453* (2018.02); *G06K 9/00201* (2013.01); *G06F 3/011* (2013.01); *G06F 3/016* (2013.01); *G06F 3/017* (2013.01); *G06F 3/0346* (2013.01); *G06K 2209/21* (2013.01); *G06K 2209/27* (2013.01)

(58) Field of Classification Search
None
See application file for complete search history.

(56) References Cited

U.S. PATENT DOCUMENTS

| | | | |
|---|---|---|---|
| 9,994,434 B2* | 6/2018 | High | B07C 5/28 |
| 10,361,802 B1* | 7/2019 | Hoffberg-Borghesani | |
| | | | G11B 27/11 |
| 2015/0163345 A1* | 6/2015 | Cornaby | G06F 3/0236 |
| | | | 345/633 |
| 2018/0336008 A1* | 11/2018 | Nakagawa | G10L 15/22 |
| 2020/0029766 A1* | 1/2020 | Ogawa | A47L 9/2842 |
| 2020/0051336 A1* | 2/2020 | Ichikawa | G06F 3/011 |

FOREIGN PATENT DOCUMENTS

| | | |
|---|---|---|
| KR | 10-2012-0113945 A | 10/2012 |
| KR | 10-2018-0130911 A | 12/2018 |

* cited by examiner

*Primary Examiner* — YuJang Tswei
(74) *Attorney, Agent, or Firm* — Birch, Stewart, Kolasch & Birch, LLP

(57) ABSTRACT

Disclosed is a mobile terminal for providing information based on an image, wherein the mobile terminal executes at least one of an installed artificial intelligence (AI) algorithm and a machine learning algorithm, and is capable of communicating with other electronic devices and external servers in a 5G communication environment. The mobile terminal includes a camera, a display, and a processor. Accordingly, since an image capture target can be accurately recognized, various services for improving user convenience can be provided.

20 Claims, 13 Drawing Sheets

METHOD AND MOBILE TERMINAL FOR PROVIDING INFORMATION BASED ON IMAGE

CROSS-REFERENCE TO RELATED APPLICATION

This present application claims benefit of priority to Korean Patent Application No. 10-2019-0101932, entitled "Method and mobile terminal for providing information based on image," filed on Aug. 20, 2019, in the Korean Intellectual Property Office, the entire disclosure of which is incorporated herein by reference.

BACKGROUND

1. Technical Field

The present disclosure relates to a method for providing information on the basis of an image and a mobile terminal therefor, and more particularly, to a method for recognizing an article disposed within an image capture range and providing information related to the recognized article on the basis of an image and a mobile terminal therefor.

2. Description of Related Art

Terminals can be classified into mobile terminals and fixed terminals according to whether or not the terminals are movable. The mobile terminals can be further classified into portable terminals and stationary terminals according to whether or not the mobile terminals are portable by a user.

Various functions of mobile terminals are being developed, and with the development of camera performance, various functions based on cameras are being developed. For example, researches are being actively carried out to develop functions of capturing high-quality still images or moving images or generating a 3D image by using depth information about an image received via a camera.

The augmented reality-based service system disclosed in Prior Art 1 (Korean Patent Application Laid-open Publication No. 10-2018-0130911, published on Dec. 10, 2018) provides a tangible user interface by adding a background image to an image captured in a virtual studio on the basis of augmented reality.

However, Prior Art 1 merely discloses that an image of a subject is simply captured, and does not discloses a method for accurately recognizing a subject.

The golf swing matching analysis system disclosed in Prior Art 2 (Korean Patent Application Laid-open Publication No. 10-2012-0113945, published on Oct. 16, 2012) captures an image of a swing motion of a user, and superposes an augmented reality-based swing motion image of a professional golfer on the captured swing motion image of the user so as to improve the athletic ability of the user.

Prior Art 2 discloses that a user's swing motion image and an AR-based swing motion image of a professional golfer are matched, but does not provide an interaction environment for performing a user operation on a recognized article.

SUMMARY OF THE INVENTION

An aspect of the present disclosure is to provide a method of providing an environment of interaction with an article disposed within an image capture range and a mobile terminal therefor.

Another aspect of the present disclosure is to provide a method of providing an augmented reality-based interface for accurately recognizing an article disposed within an image capture range and manipulating the recognized article and a terminal therefor.

Another aspect of the present disclosure is to provide a method of sequentially providing manipulation methods of an article disposed within an image capture range according to a manipulation situation of a user and a terminal therefor.

The technical problems to be solved by the present disclosure are not limited to the above problems, and other technical problems would be clearly understood by those skilled in the art from the following description.

To achieve the above objects, a mobile terminal for providing information on the basis of an image according to an embodiment of the present disclosure can interact with an article disposed within an image capture range.

In detail, the mobile terminal for providing information on the basis of an image can include an input unit having a camera, a display, and a processor for obtaining, when the object disposed within an image capture range is an article, article information about the article.

The processor can output, to the display on the basis of AR, at least one piece of manipulation method information or instruction information about the article on the basis of the obtained article information, and can obtain operation state information about the article when a predetermined manipulation operation corresponding to the manipulation method information is performed on the article. The processor can output, to the display when follow-up manipulation method information about the article is present, the follow-up manipulation method information on the basis of AR and the operation state information about the article.

A method of providing information on the basis of an image according to an embodiment of the present disclosure can include obtaining, by a processor, when an object disposed within an image capture range is an article, article information about the article, firstly outputting, by the processor, on the basis of AR, at least one piece of manipulation method information or instruction information about the article on the basis of the obtained article information, obtaining, by the processor, operation state information about the article when a predetermined manipulation operation corresponding to the manipulation method information is performed on the article, and secondly outputting, by the processor, when follow-up manipulation method information about the article is present, the follow-up manipulation method information on the basis of AR and the operation state information about the article.

The solutions to the technical problems to be solved by the present disclosure are not limited to the above solutions, and other solutions would be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIGS. 4 to 14 are diagrams illustrating operation of a mobile terminal for providing information on the basis of an image according to various embodiments of the present disclosure, wherein:

FIG. 4 is diagram illustrating operation of a mobile terminal for providing a diagnosis application according to an embodiment of the present disclosure;

FIG. 5 is diagram illustrating operation of a mobile terminal for providing information on the basis of an image according to an embodiment of the present disclosure;

FIG. 6 is a diagram illustrating operation of a mobile terminal for controlling an article through communication with the article according to an embodiment of the present disclosure;

FIG. 7 is a diagram illustrating operation of a mobile terminal for providing a method for resolving a malfunction of an article according to an embodiment of the present disclosure;

FIG. 8 is a diagram illustrating operation of a mobile terminal for controlling an article to perform a specific operation according to an embodiment of the present disclosure;

FIG. 9 is a diagram illustrating operation of a mobile terminal for providing instruction information about an article according to an embodiment of the present disclosure;

FIG. 10 is a diagram illustrating operation of a mobile terminal for providing a method of selecting an article suitable for a situation of a user according to an embodiment of the present disclosure;

FIG. 11 is a diagram illustrating operation of a mobile terminal for providing a function of comparing articles having similar functions according to an embodiment of the present disclosure;

FIG. 12 is a diagram illustrating operation of a mobile terminal which communicates with a kiosk according to an embodiment of the present disclosure;

FIG. 13 is a diagram illustrating operation of a mobile terminal for selecting an object according to an embodiment of the present disclosure; and FIG. 14 is a sequence diagram illustrating a method of operating a mobile terminal for providing information on the basis of an image according to an embodiment of the present disclosure.

DETAILED DESCRIPTION

Figure 1:
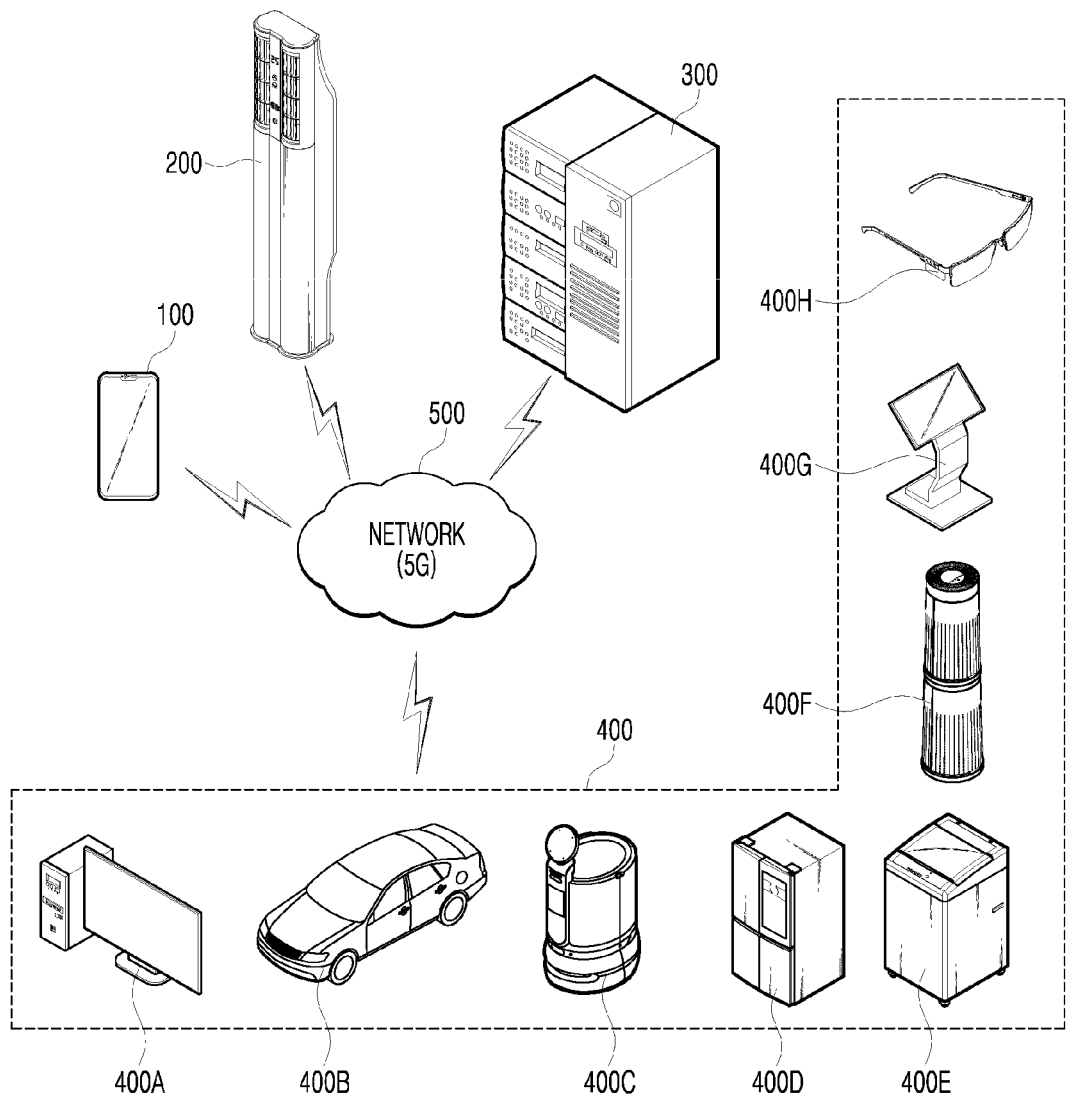
FIG. 1 is a schematic diagram illustrating a 5G network-based cloud system according to an embodiment of the present disclosure.

Technologies related to artificial intelligence and extended reality can be used in various embodiments of the present disclosure, and thus artificial intelligence and extended reality are briefly described below.

Artificial intelligence (AI) refers to a field of studying artificial intelligence or a methodology for creating the same.

Moreover, machine learning refers to a field of defining various problems dealing in an artificial intelligence field and studying methodologies for solving the same. In addition, machine learning can be defined as an algorithm for improving performance with respect to a task through repeated experience with respect to the task.

An artificial neural network (ANN) is a model used in machine learning, and can refer in general to a model with problem-solving abilities, composed of artificial neurons (nodes) forming a network by a connection of synapses. The ANN can be defined by a connection pattern between neurons on different layers, a learning process for updating a model parameter, and an activation function for generating an output value.

The ANN can include an input layer, an output layer, and can selectively include one or more hidden layers. Each layer includes one or more neurons, and the artificial neural network can include synapses that connect the neurons to one another. In an ANN, each neuron can output a function value of an activation function with respect to the input signals inputted through a synapse, weight, and bias.

A model parameter refers to a parameter determined through learning, and can include weight of synapse connection, bias of a neuron, and the like. Moreover, a hyper-parameter refers to a parameter which is set before learning in a machine learning algorithm, and includes a learning rate, a number of repetitions, a mini batch size, an initialization function, and the like.

The objective of training an ANN is to determine a model parameter for significantly reducing a loss function. The loss function can be used as an indicator for determining an optimal model parameter in a learning process of an artificial neural network.

The machine learning can be classified into supervised learning, unsupervised learning, and reinforcement learning depending on the learning method.

Supervised learning can refer to a method for training an artificial neural network with training data that has been given a label.

In addition, the label can refer to a target answer (or a result value) to be guessed by the artificial neural network when the training data is inputted to the artificial neural network. Unsupervised learning can refer to a method for training an artificial neural network using training data that has not been given a label. Reinforcement learning can refer to a learning method for training an agent defined within an environment to select an action or an action order for maximizing cumulative rewards in each state.

Machine learning of an artificial neural network implemented as a deep neural network (DNN) including a plurality of hidden layers can be referred to as deep learning, and the deep learning is one machine learning technique. Hereinafter, the meaning of machine learning includes deep learning.

eXtended Reality (XR) collectively refers to Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology can be applied to Head-Mounted Display (HMD), Head-Up Display (HUD), mobile phone, tablet PC, laptop computer, desktop computer, TV, digital signage, and so on, where a device employing the XR technology can be called an XR device.

Reference will now be made in detail to embodiments of the present disclosure, examples of which are illustrated in the accompanying drawings. Wherever possible, the same reference numbers will be used throughout the drawings to refer to the same or like parts.

In the following description, known functions or structures, which can confuse the substance of the present disclosure, are not explained.

FIG. 1 illustrates a 5G network-based cloud system according to an embodiment of the present disclosure, wherein the 5G network-based could system can include a mobile terminal 100 (hereinafter referred to as a "mobile terminal") for providing information on the basis of an image, an article 200 disposed within an image capture range of the mobile terminal 100, an information providing system 300, various devices 400, and a 5G network 500. All components of the mobile terminal 100 are operationally coupled and configured.

The mobile terminal 100 can provide information on the basis of an image. The mobile terminal 100 can be implemented as a stationary terminal and a mobile terminal, such as a mobile phone, a projector, a mobile phone, a smartphone, a laptop computer, a terminal for digital broadcast, a personal digital assistant (PDA), a portable multimedia player (PMP), a navigation system, a slate PC, a tablet PC, an ultrabook, a wearable device (for example, a smartwatch, a smart glass, and a head mounted display (HMD)), a set-top box (STB), a digital multimedia broadcast (DMB) receiver, a radio, a laundry machine, a refrigerator, a desktop computer, a digital signage. In an optional embodiment, the mobile terminal 100 can be implemented as a digital TV, a desktop computer, a digital signage, or the like.

The mobile terminal 100 can perform an operation of interaction with the article 200 disposed within the image capture range. The mobile terminal 100 can output, to a display 141 (FIG. 3), manipulation method information or instruction information about the article 200.

The article, which is an object disposed within the image capture range 100 of the mobile terminal 100, can be implemented as an air conditioner 200, but is not limited thereto and can be implemented as various devices or products having shapes according to an embodiment. Specifically, any device among the various devices 400 can be applied as the article 200.

The information providing system 300 can transmit various pieces of information to the mobile terminal 100 or the article 200 in response to a request from the mobile terminal 100 or the article 200. The information providing system 300 can include a plurality of servers, and can be implemented as a cloud-type system.

The various devices 400 can include a computer 400A, an autonomous vehicle 400B, a delivery robot 400C, a refrigerator 400D, a washing machine 400E, an air purifier 400F, a kiosk 400G, a smart glass 400H, and the like, and can transmit/receive various pieces of information via the 5G network 500.

The various device 400 can be connected to the mobile terminal 100, the article 200, the information providing system 300, and the like wirelessly or by wire via the 5G network 500 (e.g., the Internet).

The mobile terminal 100 can communicate with the article 200, the information providing system 300, the various device 400, and the like via the network 500 using a communication module. The mobile terminal 100 can request various pieces of information from the information providing system 300, and can receive various pieces of calculated/retrieved information from the information providing system 300. The calculation/retrieval can include a calculation or retrieval related to artificial intelligence.

The mobile terminal 100, the article 200, the information providing system 300, and the various devices 400 are equipped with a 5G module to transmit/receive data at a speed of about 100 Mbps to about 20 Gbps (or higher), and thus can transmit a large-size video file to various device, and can be operated with low power so as to minimize power consumption. However, the transmit speed can be varied according to an embodiment.

The 5G network 500 includes a 5G mobile communication network, a local area network, the Internet, or the like, and can provide a communication environment of devices wirelessly or by wire.

Figure 2:
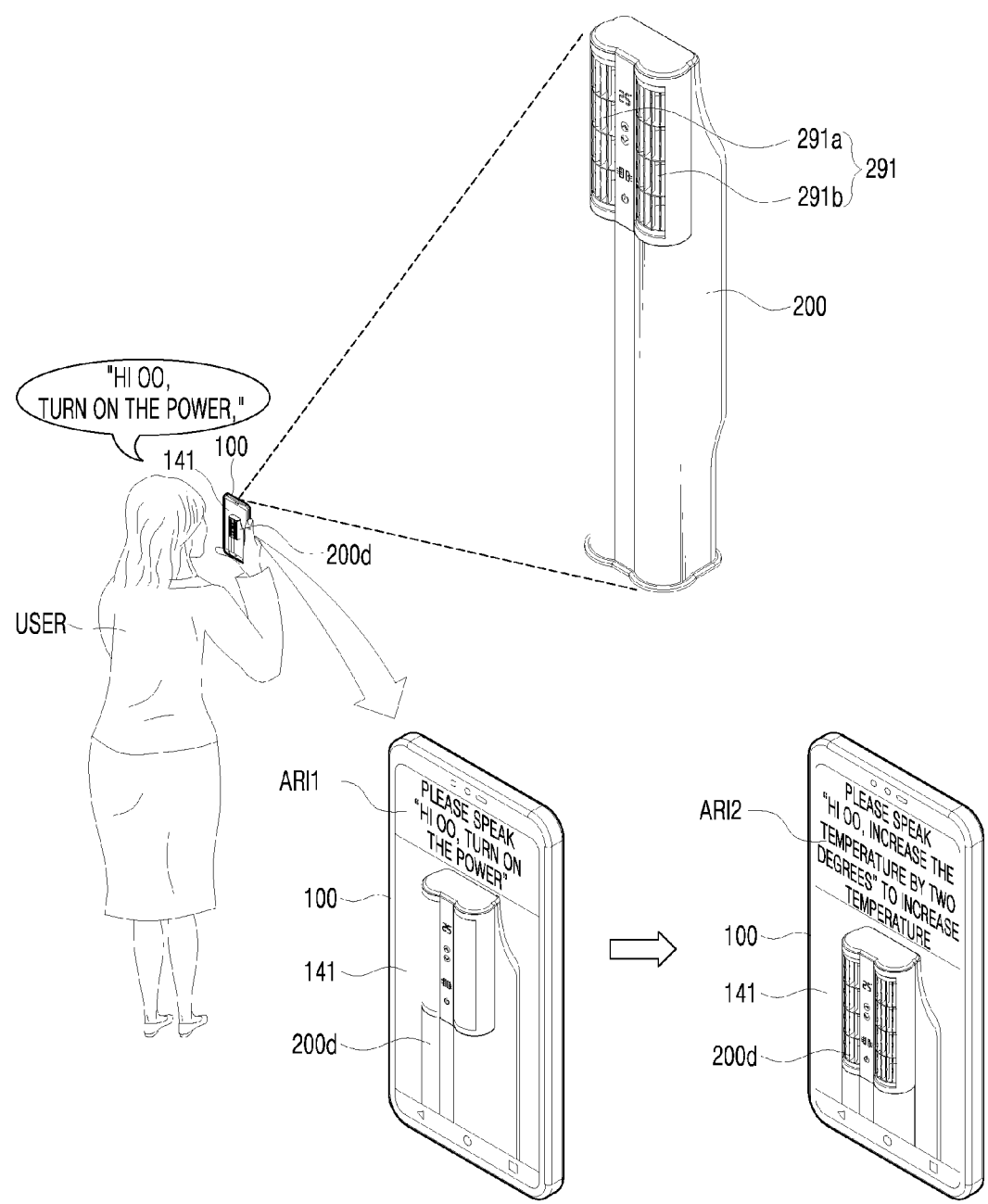
FIG. 2 is diagram schematically illustrating operation of a mobile terminal for providing information on the basis of an image according to an embodiment of the present disclosure.

FIG. 2 is a diagram for schematically describing operation of the mobile terminal 100 according to an embodiment of the present disclosure.

The mobile terminal 100 can be provided with a camera 121 (FIG. 3) to capture an image of the article 200 disposed in the same space, and can display an image-captured article 200d on a display 141.

Here, the article 200 is regarded as an air conditioner 200, but various types of products can be implemented as the article 200. The article 200 can be provided with outlets 291, including a first outlet 291a and a second outlet 291b, a power button and a temperature adjustment button, and can display temperature information.

The mobile terminal 100 can be provided with an image-based article recognition module to obtain article information about the article 200, and can recognize which operation state among operation states of the article 200 corresponds to a specific manipulation operation of the article 200 using a deep neural network model trained in advance to estimate an operation state of an article according to an operation image of the article.

When power of the article 200 disposed within the image capture range is in an off state, the mobile terminal 100 can output, to an AR item ARI1, manipulation method information displayed as the wording "please speak 'Hi OO, turn on the power! '". Accordingly, when a user utters the wording "Hi OO, turn on the power!", the power of the article 200 is turned on, and can be operated with a specific set temperature (e.g., 25 degrees).

When follow-up manipulation information is present after the article 200 is operated, the mobile terminal 100 can display the follow-up manipulation information with an AR item ARI2. The AR item ARI2 can include the wording "please speak 'Hi OO, increase the temperature by two degrees' to increase the temperature". When the user utters the wording "Hi OO, increase the temperature by two degrees", the set temperature of the article 200 can be set to be increased by two degrees. In an optional embodiment, the mobile terminal 100 can display the above items on the display 141 on the basis of VR rather than AR.

Figure 3:
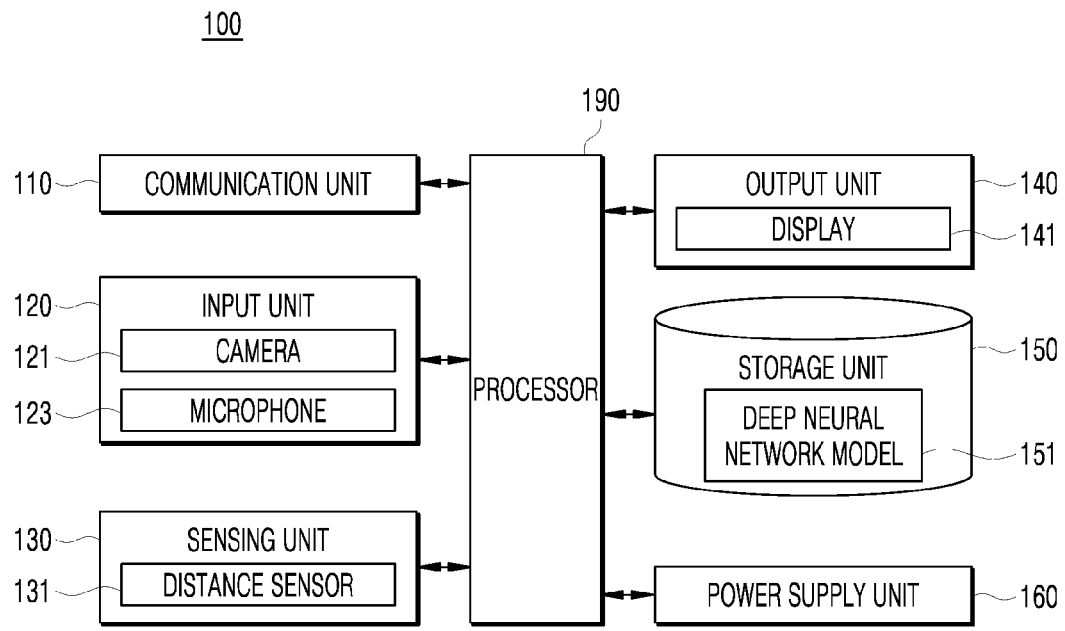
FIG. 3 is a block diagram illustrating a configuration of a mobile terminal for providing information on the basis of an image according to an embodiment of the present disclosure.

FIG. 3 is a block diagram illustrating a configuration of the mobile terminal 100 for providing information on the basis of an image according to an embodiment of the present disclosure.

Referring to FIG. 3, the mobile terminal 100 can include a communication unit 110, an input unit 120, a sensing unit 130, an output unit 140, a storage unit 150, a power supply unit 160, and a processor 190. The elements illustrated in FIG. 3 are not essential elements for implementing the mobile terminal 100, and thus the mobile terminal 100 described herein can have more elements or fewer elements that the foregoing elements.

The communication unit 110 can transmit/receive data to/from the article 200, the information providing system 300, the various devices 400 (FIG. 1), and the like using wireless/wired communication technology. For example, the communication unit 110 can transmit/receive sensor information, user input information, information about a learning model, control signal information, and the like to/from the article 200, the information providing system 300, and the various devices 400, but transmission information is not limited thereto. In some implementations, the communication unit 110 can be implemented a communicator. In some implementations, the communication unit 110 comprises at least one of a communicator or consists of at least one of a communicator.

In this case, the communications technology used by the communications unit 110 can be technology such as global system for mobile communication (GSM), code division multi access (CDMA), long term evolution (LTE), 5G, wireless LAN (WLAN), Wireless-Fidelity (Wi-Fi), Bluetooth™, radio frequency identification (RFID), infrared data association (IrDA), ZigBee, and near field communication (NFC).

The input unit 120 can include a camera 121 for inputting an image signal, a microphone 123 (hereinafter referred to as a "microphone") for receiving an audio signal, and a user input unit for receiving an input of information from the user. Here, the camera 121 or the microphone 123 can be regarded as a sensor so that signals obtained from the camera 121 or the microphone 123 can be referred to as sensing data or sensor information. In some implementations, the input unit 120 can be implemented inputter or input interface. In some implementations, the input unit 120 comprises at least one of inputter or consists of at least one of inputter. In some implementations, the input unit 120 can be configured to input data and signals.

The input unit 120 can obtain, for example, learning data for model learning and input data used when output is obtained using a learning model. The input unit 120 can obtain raw input data.

In this case, the processor 190 can extract an input feature by preprocessing the input data.

The sensing unit 130 can obtain at least one of internal information of the mobile terminal 100, surrounding environment information of the mobile terminal 100, or user information by using various sensors.

The sensing unit 130 can include a distance sensor 131, a proximity sensor, an illumination sensor, an acceleration sensor, a magnetic sensor, a gyroscope sensor, an inertial sensor, an RGB sensor, an infrared (IR) sensor, a finger scan sensor, an ultrasonic sensor, an optical sensor, a microphone, a light detection and ranging (LiDAR) sensor, radar, or a combination thereof. Here, the distance sensor 131 can measure a distance between the mobile terminal 100 and the object (article 200) disposed within the image capture range.

The output unit 140, which can generate a visual, auditory, or tactile output, can include the display 141 for outputting visual information, a speaker for outputting auditory information, and a haptic module for outputting tactile information.

The storage unit 150 can store data to support various functions of the mobile terminal 100. The storage unit 150 can store a plurality of application programs (or applications) to be driven by the mobile terminal 100, data for operating the mobile terminal 100, and commands.

In addition, the storage unit 150 can store information required for performing a calculation using artificial intelligence, machine learning, and an artificial neural network. The storage unit 150 can store a deep neural network model 151 (DNN model). The deep neural network model 151 can be used to infer a result value with respect to new input data rather than trained data, and the inferred value can be used as a basis of determination for performing a certain operation.

The deep neural network model 151 can correspond to a learning model, and can include at least one model. For example, the deep neural network model 151 can include an object recognition model, an article recognition model, an article operation state recognition model trained to estimate an operation state of an article according to a captured image of the article, and an information providing model trained to provide instruction information and manipulation method information most suitable for a current situation among pieces of article information.

The power supply unit 160 is provided with external power or internal power under control by the processor 190 to supply power to each element of the mobile terminal 100. The power supply unit 160 can include a battery. The battery can be implemented as an embedded battery or a replaceable battery, and can be chargeable using a wired or wireless charging method. Here, the wireless charging method can include a magnetic induction method or a magnetic resonance method.

The processor 190 is a module for controlling elements of the mobile terminal 100. Here, the processor 190 can represent, for example, a hardware-embedded data processing device having a physically structured circuit to execute functions expressed as instructions or codes included in a program. Examples of the hardware-embedded data processing device can include a microprocessor, a central processing unit (CPU), a processor core, a multiprocessor, an application-specific integrated circuit (ASIC), and a field programmable gate array (FPGA), but the scope of the present disclosure is not limited thereto.

The processor 190 can be provided with a separate learning processor for performing an artificial intelligence operation, or can include its own learning processor. The processor 190 can allow a model, composed of an artificial neural network to be trained using learning data. Here, the trained artificial neural network can be referred to as a trained model. The trained model can be used to infer a result value with respect to new input data rather than learning data, and the inferred value can be used as a basis for a determination to perform an operation of classifying the detected hand motion.

Here, the processor 190 can also be implemented to perform artificial intelligence processing together with a learning processor of an artificial intelligence server (e.g., the information providing system 300).

Operation of the processor 190 is described below. When an object disposed within the image capture range of the camera 121 is an article, the processor 190 can obtain the article information about the article. In detail, the processor 190 can recognize the object disposed within the image capture range.

The processor 190 can recognize the object from a captured input image on the basis of a pre-stored first deep neural network model. The first deep neural network model can be operated in the mobile terminal 100 or the information providing system 300, and can recognize what the object is from a captured input image.

On the basis of specification information about the recognized object, the processor 190 can obtain the article information when the object is an article. Here, the specification information can include certain standard information such as a quality, shape, size, performance, etc. of a product or material. According to an embodiment, the specification information can include dimension information, which is information about dimensions indicating the size, width, area, volume, or the like of an object, and can include information (e.g., one-dimensional information for a straight line, two-dimensional information for a plane, and three-dimensional information for a geometric space) indicating the area of a mathematical space.

In this case, the mobile terminal 100 can have a function of measuring the specification information about the object using various sensors, cameras, or the like. In an optional embodiment, the mobile terminal 100 can also obtain the specification information about the object through communication with the object.

Furthermore, the processor 190 can obtain the article information about the object on the basis of the specification information about the object using a pre-stored second deep neural network model. In detail, when the object is an article in an input image, the processor 190 can obtain the article information using the second deep neural network model.

Here, the article information can include article name information, model information, form information (including 3D), shape information, specifications information, Functionality information, characteristic information, manipulation method information (may be provided in plurality) for using an article, instruction information (e.g., can be provided in plurality including explanation information related to an article, information required for using an article, indication information, command information, or the like), etc. In an optional embodiment, the article information can encompass a wide range of information related to an article.

On the basis of the obtained article information, the processor 190 can output at least one piece of manipulation method information or instruction information to the display 141 on the basis of AR.

Furthermore, when a predetermined manipulation operation corresponding to the manipulation method information about an article is performed on the article, the processor 190 can obtain operation state information about the article. The processor 190 can provide the manipulation method information about an article, and can monitor whether a manipulation operation corresponding to the manipulation method information is performed on the article using the camera 121.

The processor 190 can recognize which operation state among operation states of an article corresponds to the predetermined manipulation operation using a deep neural network model trained in advance to estimate an operation state of an article according to an operation image of the article captured by the camera 121.

To this end, the processor 190 can train the deep neural network model using various pieces of input data so as to estimate an operation state of an article when an operation image corresponding to an article manipulation operation is input.

Furthermore, the processor 190 can use a pre-trained deep neural network model to learn instruction information and manipulation method information for changing an operation state of an article from a first operation state to a second operation state. Accordingly, the processor 190 can provide appropriate manipulation method information or instruction information to a proper position at an appropriate time according to the operation state of an article.

According to an embodiment, the processor 190 can receive, from an article, operation state information about the article as a communication message via the communication unit 110 without estimating the operation state of the article using the camera 121.

When a plurality of pieces of the manipulation method information about an article are provided, and the plurality of pieces of the manipulation method information are required to be performed sequentially, the processor 190 can display a first manipulation method on the display 141 on the basis of AR first, and can display a second manipulation method on the display 141 on the basis of AR when a manipulation operation has been performed on the article according to the manipulation method. The article manipulation method provided by the processor 190 can be repeatedly provided until an article manipulation operation is ended.

Furthermore, the processor 190 can display frequently asked questions (FAQ) information about an article and answer information about the FAQ information on the display 141 on the basis of AR.

Furthermore, the processor 190 can display, to a user who is using an article, predetermined customized instruction information on the display 141 on the basis AR and on the basis of at least one piece of information among collected usage pattern information about the article, arrangement location information about the article, user number information about the article, time information, weather information, and season information.

To this end, when one piece of information among the collected usage pattern information about the article, arrangement location information about the article, user number information about the article, time information, weather information, and season information is input, the processor 190 can learn recommended customized instruction information with a deep neural network model, and can recommend appropriate instruction information according to the input using the learned deep neural network model.

FIGS. 4 to 14 are diagrams for describing operation of the mobile terminal 100 for providing information on the basis of an image according to various embodiments of the present disclosure, wherein the operation can be performed by the processor 190.

Figure 4:
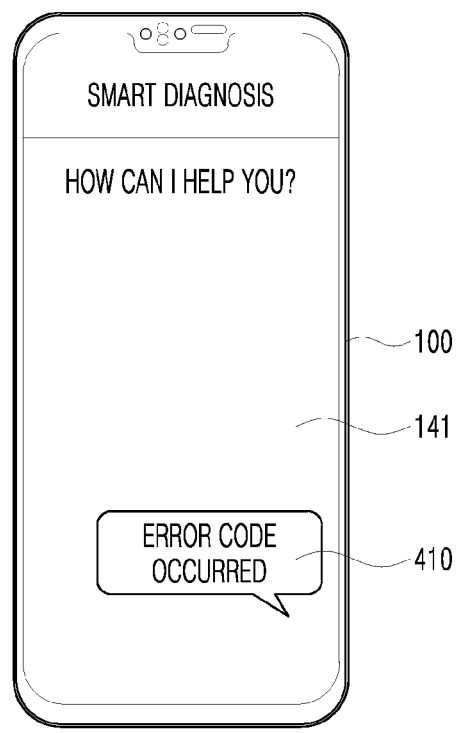

FIG. 4 is a diagram for describing a diagnosis application of the mobile terminal 100 according to an embodiment of the present disclosure.

Referring to FIG. 4, the processor 190 of the mobile terminal 100 can launch a diagnosis application before obtaining information about an article disposed within the image capture range. The diagnosis application can receive an input of request information of the user, and can perform a diagnosis related to a problem situation.

The processor 190 can receive an input of a diagnosis request message 410 related to a predetermined article through the diagnosis application. The wording "error code has occurred" can correspond to the diagnosis request message 410.

The processor 190 can launch a camera operating application in response to the diagnosis request message 410. The camera operating application can be operated in the mobile terminal 100 illustrated in FIGS. 4 to 13.

Figure 5:
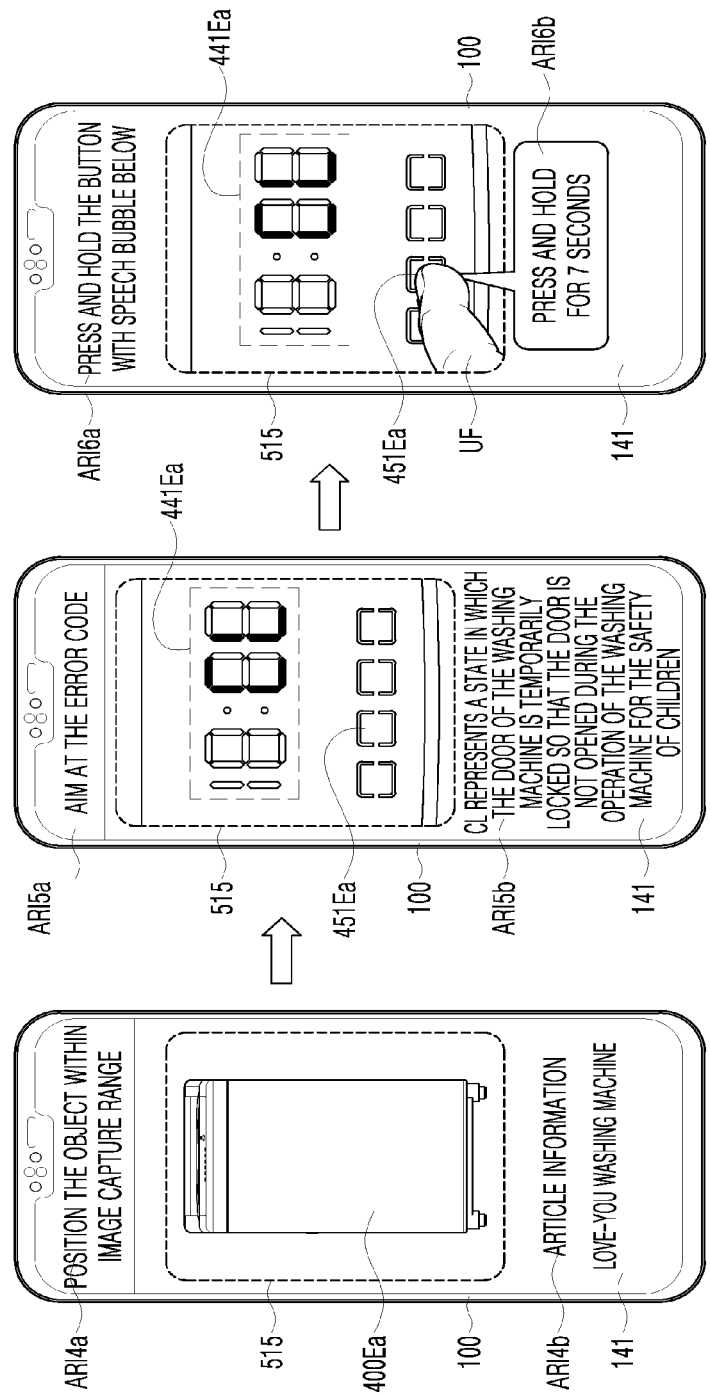

FIG. 5 is a diagram illustrating operation of the mobile terminal 100 for providing information on the basis of an image according to an embodiment of the present disclosure.

Referring to FIG. 5, the mobile terminal 100 can display an ARI item ART4*a* which disposes an image-captured article 400Ea within an image capture range 515. The ARI item ARI4*a* can be manipulation method information provided first when the camera operating application is operated, but an embodiment of the present disclosure is not limited thereto.

Furthermore, when the article 400Ea is recognized, the mobile terminal 100 can display the article name information as an ARI item ARI4b.

The mobile terminal 100 can obtain article malfunction occurrence information among pieces of article information. The mobile terminal 100 can provide, through a pre-trained deep neural network model, manipulation method information that instructs to focus a region for checking an error on the image capture range immediately when the article 400Ea is recognized. Alternatively, the mobile terminal 100 can display the manipulation method information that instructs to focus a region for checking an error on the image capture range as an ARI item ARI5a, on the basis of the diagnosis request message 410 in the camera operating application.

The mobile terminal 100 can display analysis information about the article malfunction occurrence information 441Ea as an ARI item ARI5b. The ARI item ARI5b, which is the analysis information about the malfunction occurrence information, can correspond to the instruction information. The mobile terminal 100 can analyze the malfunction occurrence information to display the analysis information about the malfunction occurrence information corresponding to a result of the analysis. The ARI item ARI5b can include analysis information about a malfunction, such as the wording "CL represents a state in which the door of the washing machine is temporarily locked so that the door is not opened during the operation of the washing machine for the safety of children". In the image capture range 515, present is one or more buttons 451Ea.

When the malfunction occurrence information is analyzed, the mobile terminal 100 can perform displaying malfunction occurrence analysis information corresponding to a result of the analysis according to a pre-trained model.

In an optional embodiment, when the mobile terminal 100 does not have the analysis information about the article malfunction occurrence information, the mobile terminal 100 can request the analysis information from the information providing system 300.

Then, the mobile terminal 100 can display an AR item ARI6a ("please press and hold the button with speech bubble below") including manipulation method information for resolving a malfunction. This follow-up manipulation method information can also be displayed using a trained rule.

When a predetermined manipulation operation is performed on the image-captured article 400Ea, the mobile terminal 100 can obtain the operation state information about the article. In detail, the mobile terminal 100 can monitor, through the camera 121, whether a user finger UF presses and holds the button for seven seconds. When the predetermined manipulation operation is performed on the article 400Ea, the mobile terminal 100 can recognize an operation state of the article 400Ea. In an optional embodiment, the mobile terminal 100 can also receive the operation state information about the article from the article through communication.

Here, on the basis of the operation state information about the article, the mobile terminal 100 can display the follow-up manipulation method information on the basis of AR when the follow-up manipulation method information about the article is present.

Figure 6:
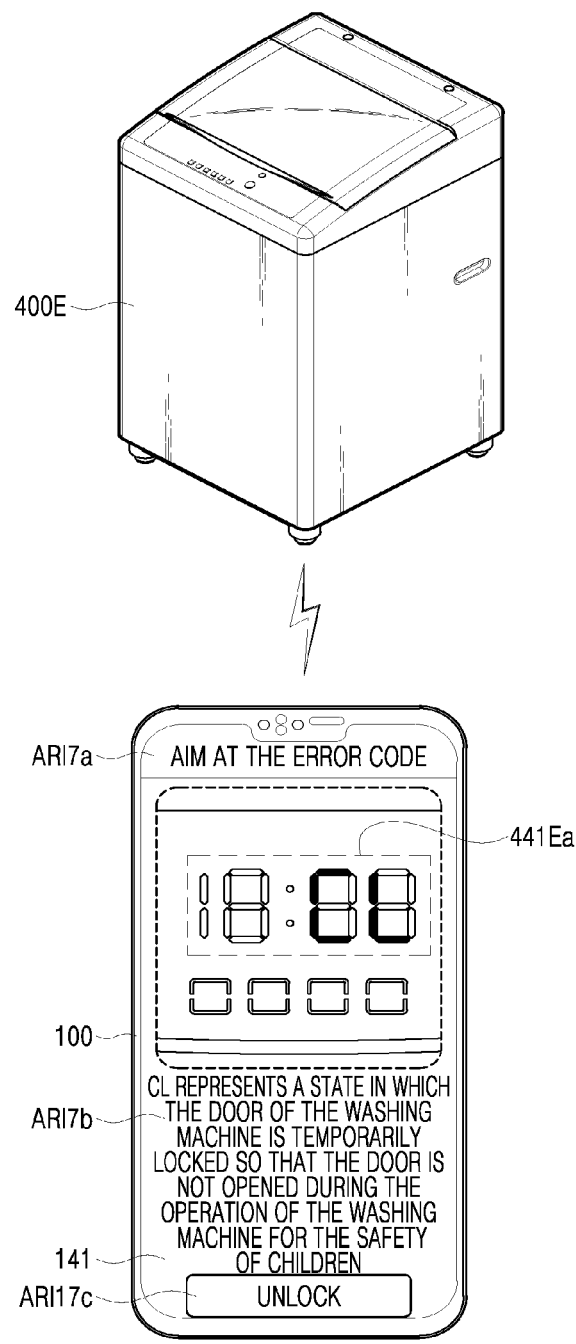

FIG. 6 is a diagram illustrating operation of the mobile terminal 100 for controlling an article 400E through communication with the article 400E according to an embodiment of the present disclosure.

The situation illustrated in FIG. 6 is similar to that illustrated in FIG. 5, but an AR item ARI7c for resolving a malfunction of the article 400E can be provided to the mobile terminal 100. The AR item ARI7c can be a trigger item for transmitting a communication command (e.g., "unlock" command) for resolving a malfunction to the article 400E. The mobile terminal 100 can determine whether to display the AR item ARI7c or to display so as to directly perform a user manipulation on the article 400E as illustrated in FIG. 5, or can display both the methods. The display method can be performed using a pre-trained deep neural network model. In the present disclosure, various deep neural network models can be provided, to which a variety of input data is input in order to obtain target output results.

Figure 7:
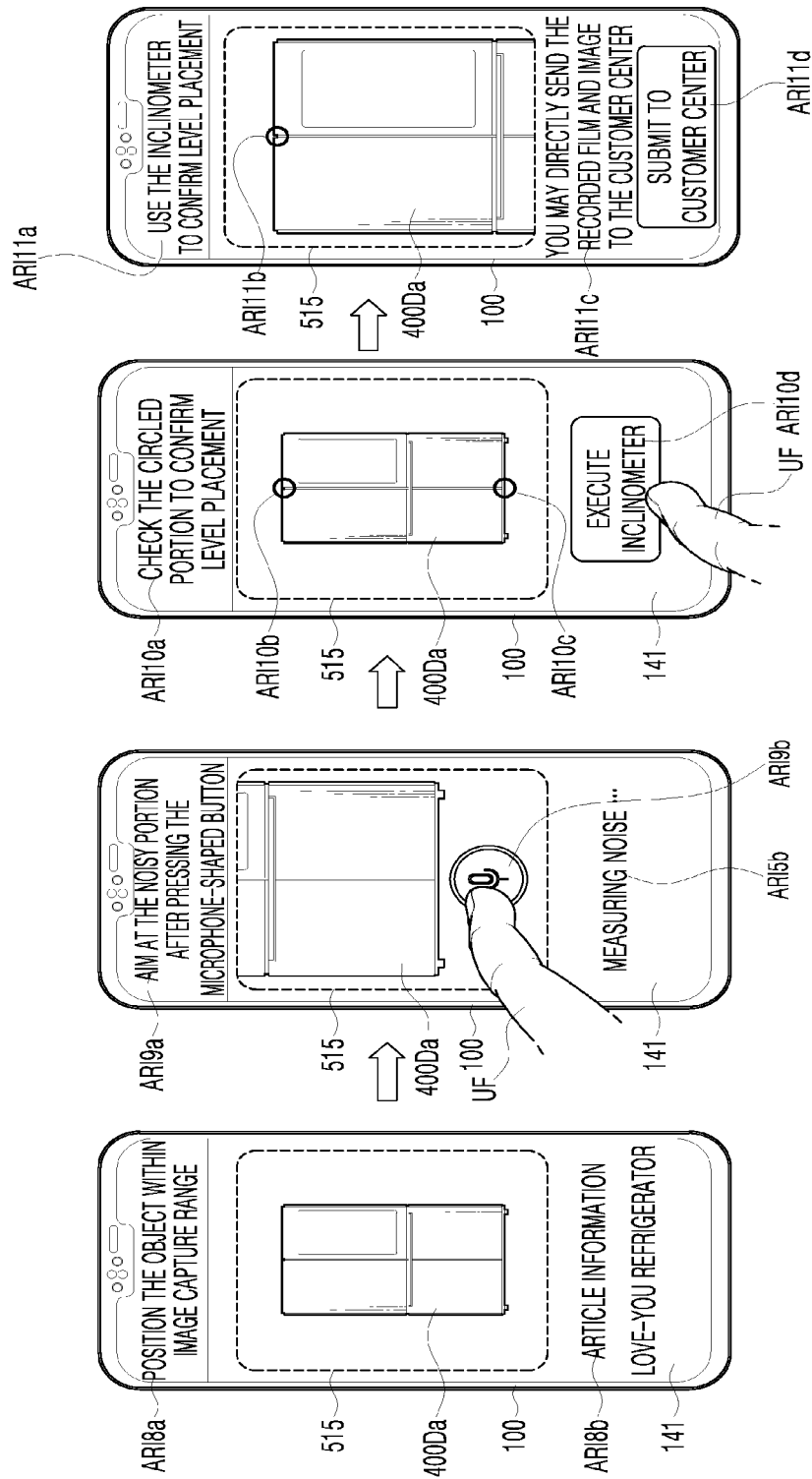

FIG. 7 is a diagram illustrating operation of the mobile terminal 100 for providing a method for resolving a malfunction of an article according to an embodiment of the present disclosure.

Referring to FIG. 7, the mobile terminal 100 can display a captured image 400 Da of a refrigerator 400D disposed within the image capture range.

The mobile terminal 100 can display a first manipulation method for checking occurrence of a malfunction (excessive noise) through an AR item ARI9a. In detail, the AR item ARI9a can include the wording "please aim at the noisy portion after pressing the microphone-shaped button".

The user can dispose the mobile terminal 100 at a noisy portion and can activate the microphone 123, and the mobile terminal 100 can receive an input of a noise measurement initiation command through an ARI item ARI9b.

When noise is determined to be higher than a preset reference, the mobile terminal 100 can display a second manipulation method through an ARI item ARI10a. In detail, the AR item ARI10a can include the wording "please check the circled portion to confirm level placement". Simultaneously, the mobile terminal 100 can display, as AR items ARI10b and ARI10c, instruction information about a region to be checked.

At the same time, the mobile terminal 100 can provide an AR item ARI10d for executing an inclinometer. When the AR item ARI10d for executing the inclinometer is selected, the mobile terminal 100 can perform an inclinometer operation on the corresponding portions ARI10b and ARI10c.

The mobile terminal 100 can re-display the portion ARI10b that is unlevel, and can display, as an ARI item ARI11a, third manipulation method information or instruction information for resolving this problem. In detail, the ARI item ARI11a can include the wording "please use the inclinometer to confirm level placement".

When an operation of leveling the portion ARI10b is not completed, the mobile terminal 100 can re-display the instruction information as an ARI item ARI11c. The ARI item ARI11c can include the wording "you can directly send the recorded film and image to the customer center".

The mobile terminal 100 can display an AR item ARI11d for submitting to a customer center, and when the AR item ARI11d is selected, an attempt can be made to establish an Internet connection or wired connection to the customer center.

The sequences of FIG. 7 executed sequentially can be performed using pre-trained model. In detail, the mobile terminal 100 can recognize all of operation state information corresponding to an actual predetermined manipulation operation of the article 400D, and can predict next manipulation method information or instruction information corresponding to an operation state of the article 400D to provide the predicted information to the user.

Figure 8:
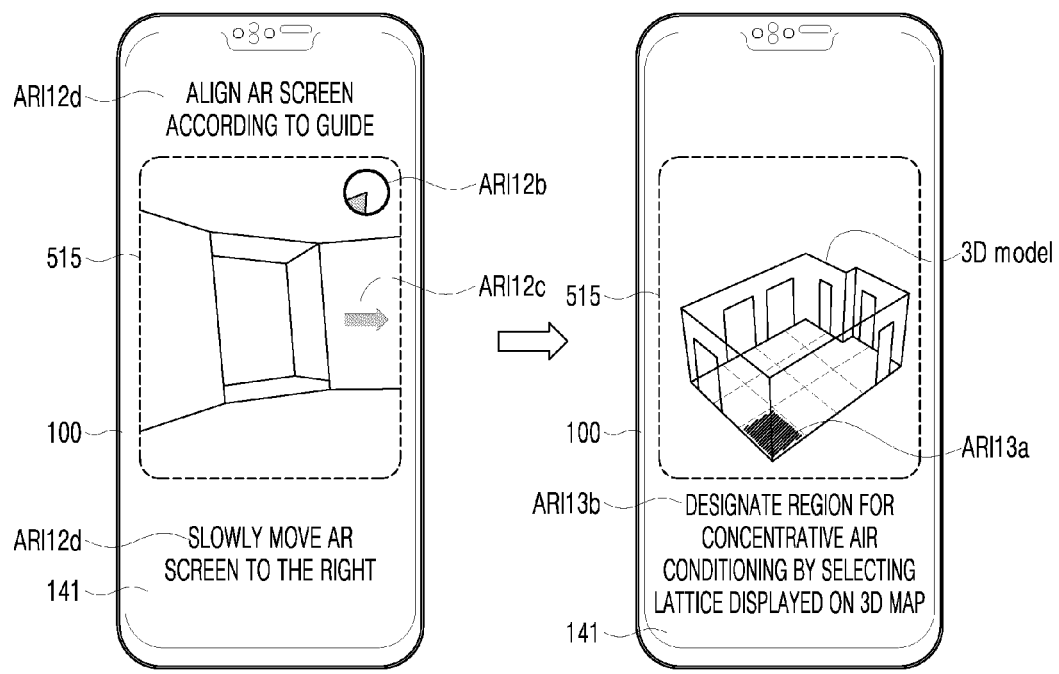

FIG. 8 is a diagram illustrating operation of the mobile terminal 100 for controlling an article (e.g., an air conditioner) to perform a specific operation according to an embodiment of the present disclosure.

The mobile terminal 100 can 3D-model a specific place in order to concentratively air-condition a predetermined specific portion. In detail, the mobile terminal 100 can capture an image of an entire specific place within an image capture range 515 of the camera 121. To this end, the mobile terminal 100 can 3D-model an interior of the specific place in a panoramic manner while rotating in one direction. Here, the mobile terminal 100 can display manipulation method information through ARI items ARI12b, ARI12c, and ARI12d.

When a specific portion ARI13a is selected by an ARI item ARI13b from an image obtained by 3D-modeling the specific place, the mobile terminal 100 can control the article 200 to concentratively air-condition the specific portion ARI13a, thereby efficiently controlling power.

Figure 9:
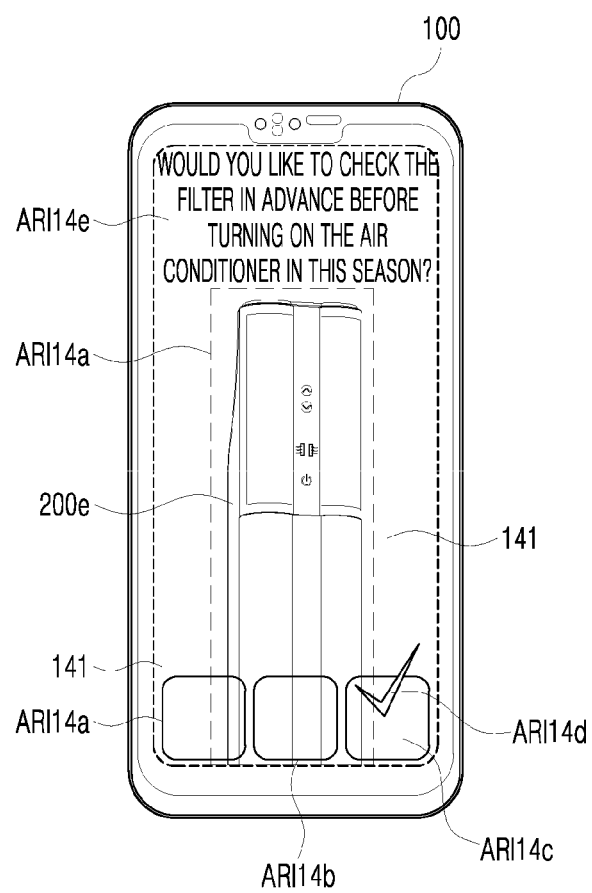

FIG. 9 is a diagram illustrating operation of the mobile terminal 100 for providing instruction information about an article according to an embodiment of the present disclosure.

Referring to FIG. 9, the mobile terminal 100 can recognize an article 200e within the image capture range, and can provide the instruction information about the article 200e as an ARI item ARI14e. The ARI item ARI14e can include the wording "would you like to check the filter in advance before turning on the air conditioner in this season?". The above wording can be generated on the basis of a situation provided from the information providing system 300 and required to be checked by priority according to a season in a corresponding article and an answer to the situation.

In particular, the mobile terminal 100 can provide a plurality of pieces of instruction information, and can indicate that there are the plurality of pieces of instruction information through ARI items ARI14a, ARI14b, and ARI14c, and can include an ARI item ARI14d indicating that the ARI item ARI14e is an item corresponding to the ARI item ARI14c.

Figure 10:
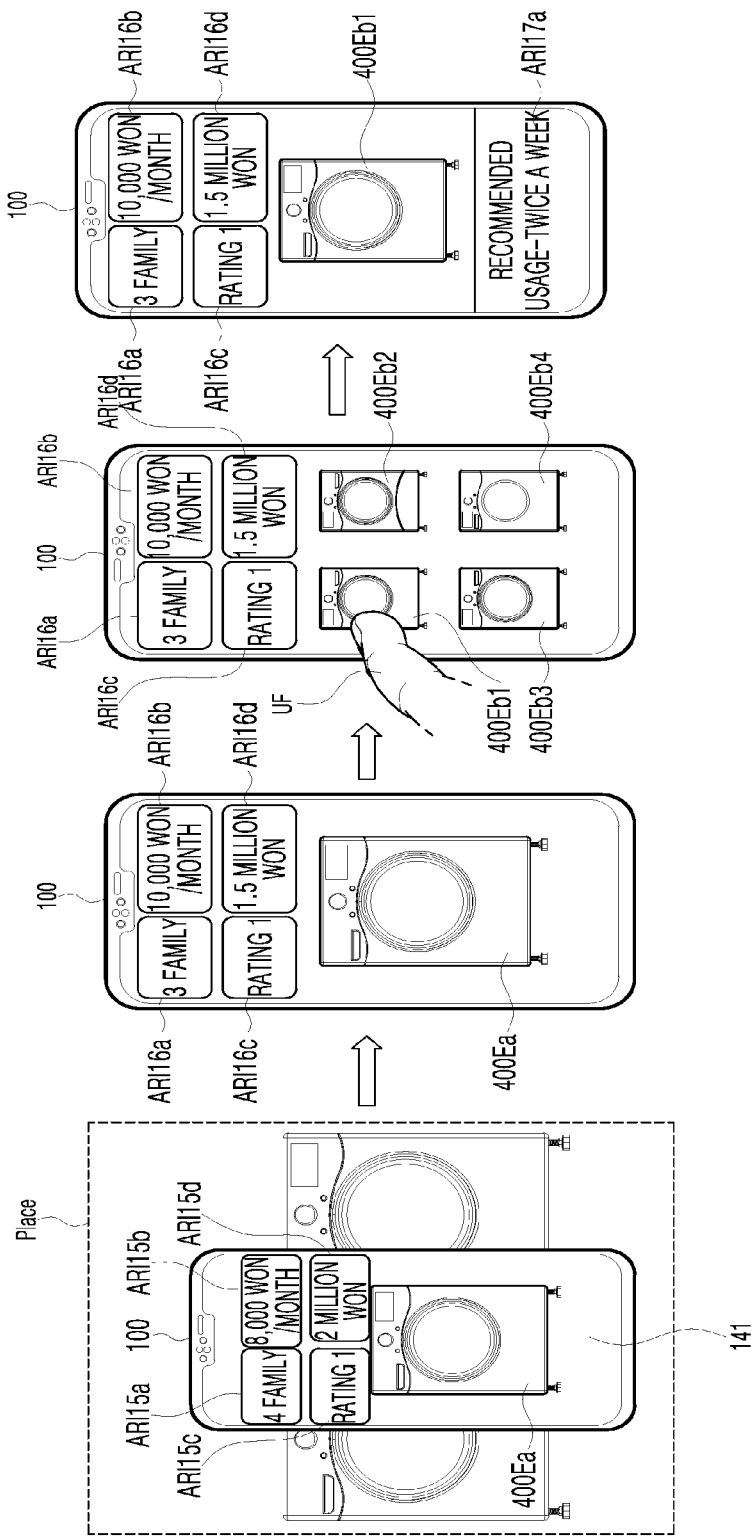

FIG. 10 is a diagram illustrating operation of the mobile terminal 100 for providing a method of selecting an article suitable for a situation of a user according to an embodiment of the present disclosure.

Referring to FIG. 10, the mobile terminal 100 can position various washing machines within the image capture range in a washing machine store, and can display the instruction information about the washing machines disposed within the image capture range.

For example, the mobile terminal 100 can display appropriate user number information, monthly cost information, power rating information, selling price information ARI15a to ARI15d, etc. When the user desires to change corresponding instruction information, the corresponding instruction can be modified (changing values from ARI15a to ARI16a, from ARI15b to ARI16b, from ARI15d to ARI16d).

The mobile terminal 100 can display the representative article 400Ea based on the changed instruction information ARI16a to ARI16d, and can display articles 400Eb1 to 400Eb4 that can be provided by the store.

When the specific article 400Eb1 is selected, the mobile terminal 100 can display the specific article 400Eb1, and can display additional instruction information as ARI item ARI17a. The ARI item ARI17a can include the wording "recommended usage: twice a week".

A sequence provided by the mobile terminal 100 can be a sequence determined by a pre-trained model.

Figure 11:
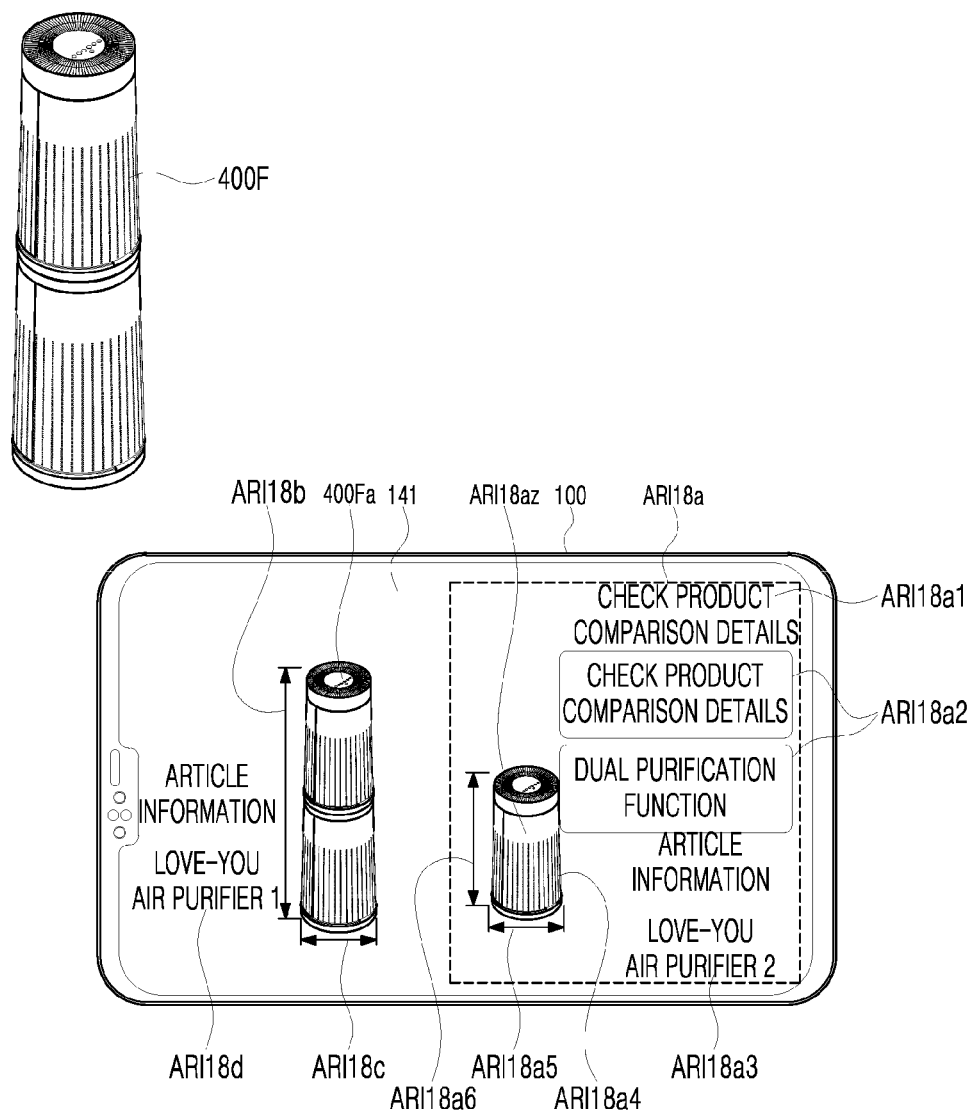

FIG. 11 is a diagram illustrating operation of the mobile terminal 100 for providing a function of comparing articles having similar functions according to an embodiment of the present disclosure.

Referring to FIG. 11, when an image of an article 400F is captured, the mobile terminal 100 can display various pieces of instruction information ARI18b, ARI18c, and ARI18d related to the article 400F with a top 400Fa, and can display an article similar to the article 400F as an ARI item ARI18az, and can display instruction information (ARI items included in the ARI item ARI18a) corresponding to the similar item.

Figure 12:
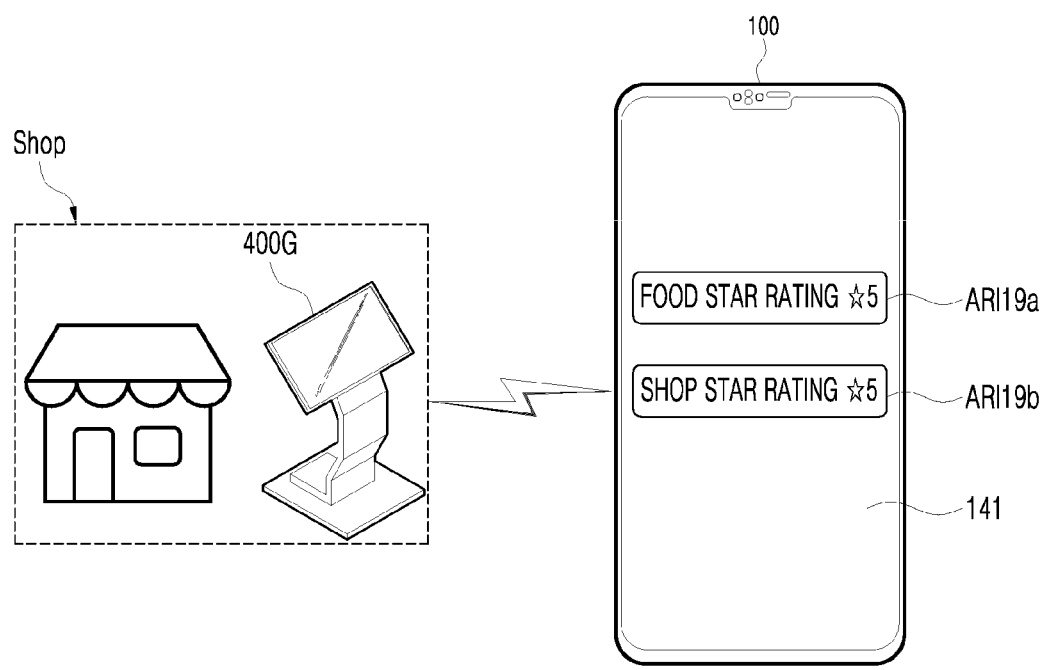

FIG. 12 is a diagram illustrating operation of the mobile terminal 100 for communicating with a kiosk 400G according to an embodiment of the present disclosure.

Referring to FIG. 12, the mobile terminal 100 can obtain at least one among information about the kiosk 400G for an order, information ARI19b about a shop for selling an ordered item, and information ARI19a about the ordered item. In an optional embodiment, the above information can be received from the information providing system 300.

The mobile terminal 100 can display, on the basis of AR, at least one among evaluation information about the ordered item, the information about the shop for selling the ordered item, and manipulation method information for an order.

Figure 13:
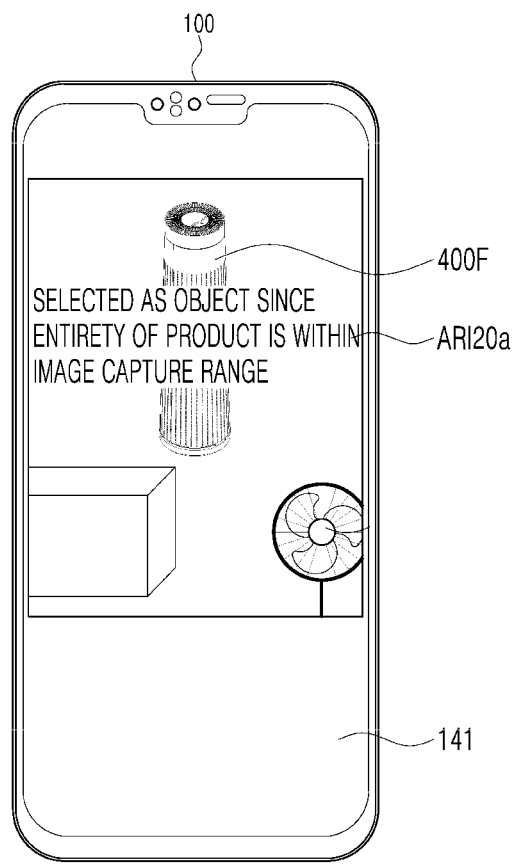

FIG. 13 is a diagram illustrating operation of the mobile terminal 100 for selecting an object according to an embodiment of the present disclosure.

Referring to FIG. 13, when images of a plurality of objects are captured, the mobile terminal 100 can select, from among the plurality of objects, the article 400F, the entirety of which is disposed within the image capture range, and can obtain article information ARI20a about the selected article 400F.

Figure 14:
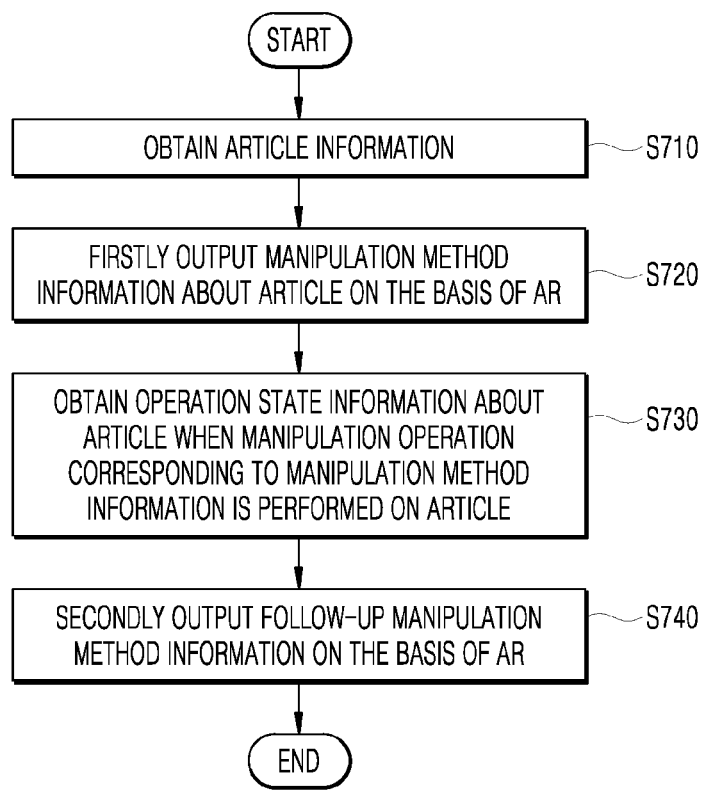

FIG. 14 is a sequence diagram illustrating a method of operating the mobile terminal 100 for providing information on the basis of an image according to an embodiment of the present disclosure.

When an object disposed within the image capture range is an article, the mobile terminal 100 obtains article information about the article (S710, article information acquisition operation).

Next, on the basis of the obtained article information, the mobile terminal 100 firstly output at least one piece of manipulation method information or instruction information about the article (S720, first output operation based on AR).

Thereafter, when a predetermined manipulation operation corresponding to the manipulation method information is performed on the article, the mobile terminal 100 obtains operation state information about the article (S730, article operation state information acquisition operation).

Thereafter, on the basis of the operation state information about the article, the mobile terminal 100 secondly outputs follow-up manipulation method information on the basis of AR when the follow-up operation method information about the article is present (S740, second output operation based on AR).

Operation S710 (article information acquisition operation) can include recognizing an object and obtaining article information about the object on the basis of specification information about the recognized object.

Operation S730 (article operation state information acquisition operation) can include, when a predetermined manipulation operation is performed on an article, monitoring the manipulation operation through a camera and recognizing which operation state among operation states of the article corresponds to the predetermined manipulation operation using a deep neural network model trained in advance to estimate an operation state of an article according to an operation image of the article.

Furthermore, operation S730 (article operation state information acquisition operation) can include, when a predetermined manipulation operation is performed on the article, receiving, from the article, a communication message including operation state information about the article.

Furthermore, operation S710 (article information acquisition operation) can include obtaining malfunction occurrence information about the article. In this case, operation S730 (first output operation based on AR) can include displaying manipulation method information for resolving a malfunction of the article on the basis of AR and on the basis of the malfunction occurrence information and analysis information about the malfunction occurrence information.

The displaying on the basis of AR can include focusing a predetermined region of the article for displaying the malfunction occurrence information within the image capture range and displaying the manipulation method information for resolving a malfunction of the article on the basis of AR.

A method of providing, by the mobile terminal 100, information on the basis of an image can include displaying an item for resolving a malfunction of an article and transmitting, when the item is selected by user's manipulation, a communication command for resolving the malfunction of the article, which corresponds to the item, to the article.

Furthermore, operation S720 (first output operation based on AR) can include displaying frequently asked questions (FAQ) information about the article and answer information about the FAQ information on the basis of AR.

Operation S720 (first output operation based on AR) can include displaying, to a user who is using the article, predetermined customized instruction information on the basis of AR and on the basis of at least one piece of information among usage pattern information about the article, arrangement location information about the article, user number information about the article, time information, weather information, and season information.

The displaying on the basis of AR can include displaying, on the basis of AR, predetermined instruction information for proposing using an improved article having improved performance or design.

Operation S720 (first output operation based on AR) can include displaying the article and article information, displaying a similar article that is similar to the article and article information about the similar article, and displaying, when the similar article is selected, an image in which the article information and the similar article information are compared.

Furthermore, operation S710 (article information acquisition operation) can include obtaining, when the article is a kiosk 400G for an order, at least one among information about the kiosk, information about a shop for selling an ordered item, and information about the ordered item.

In this case, operation S720 (first output operation based on AR) can include displaying, on the basis of AR, at least one among evaluation information about the ordered item, the information about the shop for selling the ordered item, and manipulation method information for an order.

The mobile terminal 100 can be connected to the kiosk 400G through communication using inaudible frequencies or beacon communication. When a previous order history is present, the mobile terminal 100 can use this order history for an order or payment.

When placing an order through a menu, the mobile terminal 100 can display, on the basis of AR, size information about a corresponding ordered item, and displayed size information can be selected.

A clerk of a store can carry the mobile terminal 100 to recognize a visiting customer (e.g., recognize a face) to map the visiting customer to a table and map the table to an ordered item so as to perform integral management.

Furthermore, operation S710 (article information acquisition operation) can include selecting, when one or more objects are arranged within the image capture range, a predetermined object in response to a user's selection command or selecting an object that dominantly occupies an image capture region and obtaining article information about the selected object on the basis of specification information about the selected object.

Some embodiments of the present disclosure can bring about the following effects.

First, since an environment of interaction with an article disposed within an image capture range is provided, user convenience can be improved.

Second, since a method of sequentially providing manipulation methods of an article disposed within an image capture range according to a manipulation situation of a user is provided, an emotional interaction can be provided so that a user can feel as if a person skilled with a manipulation method kindly teaches a manipulation method to the user, thereby improving user convenience.

Third, since article information about an object disposed within an image capture range can be accurately obtained, so that user convenience can be improved, and device operation accuracy can be improved.

The above-mentioned embodiments can be implemented as computer-readable codes in a program-recorded medium. The computer readable medium includes all types of recording devices in which data readable by a computer system readable can be stored. Examples of the computer-readable medium can include a Hard Disk Drive (HDD), a Solid State Drive (SSD), a Silicon Disk Drive (SDD), a Read Only Memory (ROM), a Read Access Memory (RAM), a compact disc read only memory (CD-ROM), a magnetic tape, a floppy disk, and an optical data storage device. In addition, the above-mentioned computer can also include a processor 190 of the mobile terminal 100.

In the foregoing, while specific embodiments of the present disclosure have been described for illustrative purposes, the scope or spirit of the present disclosure is not limited thereto, it will be understood by those skilled in the art that various changes and modifications can be made to other specific embodiments without departing from the spirit and scope of the present disclosure. Therefore, the scope of the present disclosure should be defined not by the above-described embodiments but by the technical idea defined in the following claims.

What is claimed is:

1. A method of providing information based on an image, the method comprising:
   when an object is disposed within an image capture range of an article, obtaining by at least one processor, article information about the article based on specification information of the article;
   based on augmented reality (AR), firstly outputting by the processor, at least one piece of manipulation method information or instruction information about the article based on the obtained article information;
   when a predetermined manipulation operation corresponding to the manipulation method information is performed on the article, obtaining by the processor, operation state information about the article; and when follow-up manipulation method information about the article is present, secondly outputting by the processor, the follow-up manipulation method information based on the AR and the operation state information about the article, wherein the obtaining the article information comprises obtaining malfunction occurrence information about the article, and wherein the firstly outputting the manipulation method information based on the AR comprises:

displaying the manipulation method information for resolving a malfunction of the article based on the malfunction occurrence information and analysis information about the malfunction occurrence information based on the AR.

2. The method of claim 1, wherein the obtaining the article information comprises:

recognizing the object; and obtaining the article information about the object based on specification information about the recognized object.

3. The method of claim 2, wherein the obtaining the article information comprises:

when one or more objects are arranged within the image capture range, selecting an object in response to a user's selection command or selecting an object that dominantly occupies an image capture region; and obtaining the article information about a selected object based on specification information about the selected object.

4. The method of claim 1, wherein the obtaining the operation state information about the article comprises:

when the predetermined manipulation operation is performed on the article, monitoring the manipulation operation through a camera; and recognizing which operation state among operation states of the article corresponds to the predetermined manipulation operation using a deep neural network model trained in advance to estimate an operation state of the article according to an operation image of the article.

5. The method of claim 1, wherein the obtaining the operation state information about the article comprises:

receiving a communication message including the operation state information about the article from the article when the predetermined manipulation operation is performed on the article.

6. The method of claim 1, wherein the displaying based on the AR comprises:

focusing on a predetermined region of the article for displaying the malfunction occurrence information within the image capture range; and displaying the manipulation method information for resolving the malfunction of the article based on the AR.

7. The method of claim 1, further comprising:

displaying an item for resolving the malfunction of the article; and when the item is selected by a user's manipulation, transmitting to the article a communication command corresponding to the article for resolving the malfunction of the article.

8. The method of claim 1, wherein the firstly outputting the instruction information based on the AR comprises:

displaying frequently asked questions (FAQ) information about the article and answer information about the FAQ information based on the AR.

9. The method of claim 1, wherein the firstly outputting the instruction information based on the AR comprises:

displaying predetermined customized instruction information based on the AR and at least one piece of information among usage pattern information about the article, arrangement location information about the article, user number information about the article, time information, weather information, and season information to a user who is using the article.

10. The method of claim 9, wherein the displaying based on the AR comprises:

displaying predetermined instruction information for proposing using an improved article achieved by improving performance or design of the article based on the AR.

11. The method of claim 1, wherein the firstly outputting the instruction information based on the AR comprises:

displaying the article and the article information;

displaying a similar article that is similar to the article and similar article information about the similar article; and when the similar article is selected, displaying an image in which the article information and the similar article information are compared.

12. The method of claim 1, wherein the obtaining the article information comprises obtaining at least one among information about a kiosk, information about a shop for selling an ordered item, and information about the ordered item when the article is the kiosk for an order, and wherein the firstly outputting based on the AR comprises displaying at least one among evaluation information about the ordered item, the information about the shop for selling the ordered item, and the manipulation method information for an order based on the AR.

13. The method of claim 1, further comprising:

launching a diagnosis application before the obtaining the article information;

receiving a diagnosis request message about a predetermined article through the diagnosis application; and launching a camera operating application related to the diagnosis request message.

14. A mobile terminal for providing information based on an image, the mobile terminal comprising:

a camera;

a display; and at least one processor configured to:

obtain article information about an article based on specification information of the article, when an object disposed within an image capture range of the camera is the article;

based on augmented reality (AR), output at least one piece of manipulation method information or instruction information about the article to the display based on the obtained article information, and obtain operation state information about the article when a predetermined manipulation operation corresponding to the manipulation method information is performed on the article; and when follow-up manipulation method information about the article is present, output to the display the follow-up manipulation method information based on the AR and the operation state information about the article, wherein the obtaining the article information comprises obtaining malfunction occurrence information about the article, and wherein the outputting of the manipulation method information based on the AR comprises:

displaying the manipulation method information for resolving a malfunction of the article based on the malfunction occurrence information and analysis information about the malfunction occurrence information based on the AR.

15. The mobile terminal of claim 14, wherein the processor is further configured to recognize the object, and obtain the article information about the object based on specification information about the recognized object.

16. The mobile terminal of claim 14, wherein the processor is further configured to:
when the predetermined manipulation operation is performed on the article, monitor the manipulation operation through the camera; and
recognize which operation state among operation states of the article corresponds to the predetermined manipulation operation using a deep neural network model trained in advance to estimate an operation state of the article according to an operation image of the article.

17. The mobile terminal of claim 14, further comprising:
a communicator,
wherein, when the manipulation operation is performed on the article, the processor is further configured to receive a communication message including the operation state information about the article through the communicator from the article.

18. The mobile terminal of claim 14, wherein the processor is further configured to display frequently asked questions (FAQ) information about the article and answer information about the FAQ information based on the AR on the display.

19. The mobile terminal of claim 18, wherein the processor is further configured to display predetermined customized instruction information based on the AR and at least one piece of information among usage pattern information about the article, arrangement location information about the article, user number information about the article, time information, weather information, and season information on the display to a user who is using the article.

20. A method of providing information based on an image, the method comprising:
when an object is disposed within an image capture range of an article, obtaining by at least one processor, article information about the article based on specification information of the article;
based on augmented reality (AR), firstly outputting by the processor, at least one piece of manipulation method information or instruction information about the article based on the obtained article information;
when a predetermined manipulation operation corresponding to the manipulation method information is performed on the article, obtaining by the processor, operation state information about the article; and
when follow-up manipulation method information about the article is present, secondly outputting by the processor, the follow-up manipulation method information based on the AR and the operation state information about the article,
wherein the firstly outputting the instruction information based on the AR comprises:
displaying the article and the article information;
displaying a similar article that is similar to the article and similar article information about the similar article; and
when the similar article is selected, displaying an image in which the article information and the similar article information are compared.

* * * * *